United States Patent
Marie et al.

(10) Patent No.: US 7,735,374 B2
(45) Date of Patent: Jun. 15, 2010

(54) EQUIPMENT COMPRISING AT LEAST ONE ROTARY MEMBER AND MEANS FOR MEASURING VIBRATIONAL FREQUENCIES OF SAID MEMBER TO DETERMINE ITS WEAR CONDITION, CORRESPONDING CONTROL UNIT AND METHOD

(75) Inventors: Vincent Marie, Vesinet (FR); Nicolas Le Du, Quimperle (FR); Benoît Allenou, Orvault (FR); Arnaud Gilibert, Nantes (FR); Laurent Pineau, Nantes (FR)

(73) Assignee: Etablissements Georges Renault, Saint-Sebastian-sur-Loire (FR)

( * ) Notice: Subject to any disclaimer, the term of this patent is extended or adjusted under 35 U.S.C. 154(b) by 0 days.

(21) Appl. No.: 11/884,977

(22) PCT Filed: Feb. 23, 2006

(86) PCT No.: PCT/EP2006/060205

§ 371 (c)(1),
(2), (4) Date: Jul. 14, 2008

(87) PCT Pub. No.: WO2006/089925

PCT Pub. Date: Aug. 31, 2006

(65) Prior Publication Data

US 2008/0271580 A1 Nov. 6, 2008

(30) Foreign Application Priority Data

Feb. 24, 2005 (FR) .................................. 05 01908

(51) Int. Cl.
*F16B 31/02* (2006.01)

(52) U.S. Cl. ..................................... 73/761; 73/862.08
(58) Field of Classification Search .................. 73/761, 73/862.22–862.23
See application file for complete search history.

(56) References Cited

U.S. PATENT DOCUMENTS

| | | | | |
|---|---|---|---|---|
| 3,694,637 | A * | 9/1972 | Edwin et al. | 702/34 |
| 3,714,822 | A * | 2/1973 | Lutz | 73/104 |
| 4,220,995 | A | 9/1980 | Shoda | |
| 4,758,964 | A * | 7/1988 | Bittner et al. | 702/34 |
| 4,831,365 | A * | 5/1989 | Thomas et al. | 340/680 |
| 4,928,521 | A * | 5/1990 | Jardine | 73/152.43 |
| 4,955,269 | A * | 9/1990 | Kendig et al. | 73/577 |
| 6,260,004 | B1 * | 7/2001 | Hays et al. | 702/183 |
| 2002/0017139 | A1 | 2/2002 | Kluft et al. | |
| 2003/0037423 | A1 | 2/2003 | Siegel | |

FOREIGN PATENT DOCUMENTS

DE 43 34 933 4/1995

(Continued)

*Primary Examiner*—Max Noori
(74) *Attorney, Agent, or Firm*—Westman, Champlin & Kelly, P.A.

(57) ABSTRACT

A screwing equipment that comprises at least one rotary member mounted in a tool body and capable of producing at least one vibrational frequency representing a wear condition of said rotary member(s). Such screwing equipment further comprises means for measuring said vibrational frequencies designed to communicate with means for processing, said measurement enabling same to be compared to at least one reference frequency in order to determine said wear condition.

6 Claims, 3 Drawing Sheets

FOREIGN PATENT DOCUMENTS

| | | |
|---|---|---|
| DE | 197 28 909 | 9/1998 |
| FR | 2 427 173 | 12/1979 |
| GB | 2 164 775 | 3/1986 |
| JP | 62 088525 | 4/1987 |
| WO | WO 00/73018 | 12/2000 |

* cited by examiner

EQUIPMENT COMPRISING AT LEAST ONE ROTARY MEMBER AND MEANS FOR MEASURING VIBRATIONAL FREQUENCIES OF SAID MEMBER TO DETERMINE ITS WEAR CONDITION, CORRESPONDING CONTROL UNIT AND METHOD

CROSS-REFERENCE TO RELATED APPLICATION

This Application is a Section 371 National Stage Application of International Application No. PCT/EP2006/060205, filed Feb. 23, 2006, and published as WO 2006/089925 A1, on Aug. 31, 2006, not in English, the content of which is hereby incorporated by reference in its entirety.

BACKGROUND

The field of the subject of this disclosure is that of equipment. More specifically, the disclosure relates to production machinery, and in particular equipment provided for screwing with a predetermined torque.

In the field of the subject of this disclosure, screwing tools are very commonly used in the industrial sector, whether the tools are stationary (including tools mounted on machines or manipulators) or portable.

These tools can include electric motor or pneumatic means according to the envisaged applications.

According to a common implementation of these tools, they are connected by suitable connectors to an electronic controller (in the form of an electrical box) making it possible to program a large number of operation cycles (for example 250 cycles), wherein each cycle can be composed of 20 operation phases.

These cycles can be programmed directly by a keyboard comprised by the electric box or by associated programming software (the box(es) then being connected to the programming system by a ground network, Ethernet or other type of network).

These systems make it possible to ensure the traceability of the operations performed by the tool, by, for example, recording results such as the final screwing torque, the screwing speed, the final screwing angle, the date and time of the operations, or the curves representing the quality (Good or Poor, according to predetermined parameters) of the screwing performed.

The tool itself can also comprise means for indicating the screwing quality, for example by providing a report "Good/Poor" that can be displayed by LEDs.

It is understood that systems of this type make it possible to perform a wide range of parameterisation and control operations.

Nevertheless, as mentioned above, equipment assemblies such as those described above require the use of connection networks that are more or less logical in order to connect the controllers to the tools and the controllers to the programming equipment.

It is understood that these constraints can result in an increase in the operating cost.

According to a known technique, the tool is connected to the electrical section so as to supply power to control electronics integrated in the tool. In this case, the tool has a small display device and some control buttons.

It is understood that, in one or the other of the technologies described above, the data concerning the screwing torque is essential for properly controlling the tools and in order to be capable of obtaining a follow-up on the screwing results.

Indeed, the data on the screwing torque is used numerous times, to of course ensure the quality of the assembly to be produced by screwing, but also to allow for traceability of the operations and to carry out statistical processing of the tightening data.

In addition, the tools are controlled by command means, integrated in the tool or external to the tool, which define the parameters of operation of the tool according to the assembly to be performed.

However, whether it is for the control and/or the follow-up on the screwing parameters or for the proper execution of these parameters, it is necessary to ensure, above all, the good condition of operation of the tools.

In other words, the reliability of the tools must be capable of being verified, regularly during the entire period of use of the tools, so as to be capable of performing maintenance operations, preferably preventative maintenance. It is thus desirable to avoid in particular the conditions of wear leading to the breakage of the tools on the production line, requiring this line to be stopped so that the tool can be replaced. This of course adversely affects the overall efficiency of the production line concerned.

Currently, preventative maintenance is limited to recommendations by the tool manufacturers, which recommendations involve a servicing schedule.

Optionally, a system of calculations performed by a software program contained in a tool control box automatically determines the servicing schedule according to the real conditions of use of the tool (torque, speed, temperature, etc.).

It is understood that in one case or another, the servicing recommendations result from an empirical approach leading to only an estimation of the wear of the tool.

Such an approach to the servicing and/or maintenance of tools can therefore lead to two types of situations:

the recommendations are prudent and encourage servicing or maintenance that is more frequent than necessary: this tends to increase the tool operation cost;

certain tools deteriorate between two servicing operations, possibly to the point of causing a permanent defect in the tools concerned, possibly resulting in breakage of the tools during use; this can also cause defective work on the assemblies produced by a defective tool before its state is detected; in any case, this type of situation is unacceptable in that it can lead in particular to notable operating losses.

The subject of this disclosure relates to a screwing tool including at least one rotary member mounted in a tool body and capable of producing at least one vibration frequency representing a condition of wear of said rotary member(s), characterised in that it includes means for measuring said vibration frequency or frequencies intended to communicate with means for processing said measurement, making it possible to compare it with at least one reference frequency so as to determine the condition of wear.

Thus, owing to the subject of this disclosure, it is possible to determine the real condition of wear of a tool, and more specifically of the rotary members that constitute it.

Indeed, each rotary member of the tool produces a characteristic frequency that can be calculated, which is a function of the rotation speed and the geometry of the member considered.

It is then possible for a new tool, and, for each of the characteristic frequencies, to perform a measurement and a recording of the amplitude. These amplitudes constitute reference amplitudes corresponding to a new condition of the tool.

During the lifetime of the tool, the mechanical members tend to become worn and their vibration amplitude increases. The measurement of the amplitude of the characteristic frequencies and their comparison with the reference amplitudes makes it possible to assess the degree of wear of the various members.

It is therefore understood that the subject of this disclosure makes it possible to optimise the servicing and/or maintenance interventions, which are activated and performed on the basis of a condition of wear that is measured and no longer only estimated.

It is therefore possible in this way to better anticipate situations of wear, and even the breakage of tools.

More generally, the subject of this disclosure makes it possible to obtain improvements in numerous control operations and/or in the assembly quality, by regularly ensuring the good condition of the tools and therefore their reliability.

According to an advantageous solution, said rotary member(s) are intended to produce a tightening torque, with said measurement means including at least means for measuring said torque.

Indeed, it is noted that the signal for measuring the torque includes all of the data representing the vibrations of the rotary member(s) of the tool.

In other words, the measurement of the tightening torque provides the data necessary for measuring the condition of wear, without it being necessary to add components to the tool body or to modify the existing components.

Said processing means advantageously include calculation means making it possible to process a frequency spectrum obtained on the basis of a signal transmitted by said means for measuring said torque.

Thus, the signal for measuring the torque can have a spectrum of which the lines can easily be compared to a reference frequency or to a series of reference frequencies.

Said processing means preferably include means for storing a reference frequency relative to each of said rotary members.

In this way, it is possible to issue a diagnosis of the condition of wear not only for the motor but also for the associated rotary members, each being characterised by a reference vibration frequency.

In this case, a reference frequency is preferably stored for at least one of the members belonging to the following group:
  motor;
  bell crank member; and
  gear member.

It is noted that if a bell crank member is implemented, the head of the tool integrates a conical torque and the ball rollers, which are sensitive mechanical members capable of producing a characteristic frequency of which the amplitude can be compared, as for the other rotating members, to reference amplitudes.

According to one embodiment, said processing means are integrated in a control unit separate from said tool.

It is thus possible to collect all of the data on the preventative maintenance on a unit independent of the tool, which unit can also perform other functions such as the control and/or the parameterisation of the tool.

It is noted that the dispatching and processing of preventative maintenance data on a control unit separate from the tool makes it possible to use the tools currently available, without any modification thereof.

However, it is possible in other embodiments that can be envisaged, to integrate the processing of the maintenance data directly in the tool, insofar as the dimensions thereof allow it.

Said unit advantageously includes at least one display device.

It is thus possible to display specific information, as text. However, the use of visual signals, such as lights and colours, can also be envisaged.

In one embodiment, said unit includes communication means capable of being connected to a communication network.

The control unit can thus send data to a remote unit, for centralising data, for example, by means in particular of the computer network of a company.

The subject of this disclosure also relates to a control unit intended to be provided in equipment including at least one rotary member mounted in a tool body and capable of producing at least one vibration frequency representing a condition of wear of said rotary member(s), characterised in that it includes means for processing at least one vibration frequency measurement making it possible to compare it with at least one reference frequency so as to determine said condition of wear, which equipment includes means for measuring said vibration frequency or frequencies.

The subject of this disclosure also relates to a method for checking the condition of wear of equipment including at least one rotary member mounted in a tool body and capable of producing at least one vibration frequency representing a condition of wear of said rotary member(s), characterised in that it includes the steps of:
  measuring said vibration frequency or frequencies; and
  comparing said vibration frequency or frequencies with at least one reference frequency in order to determine said condition of wear.

DRAWINGS

Other features and advantages of the subject of this disclosure will become clearer on reading the following description of one embodiment thereof, provided by way of an illustrative and non-limiting example, and appended drawings, in which.

DESCRIPTION IN REFERENCE TO THE DRAWINGS

According to one embodiment described below, the equipment to which the subject of this disclosure is applied includes a screwing tool.

It is nevertheless noted that the subject of this disclosure can be applied to any equipment including a tool with a rotary member, which transmits a vibration frequency capable of being measured and compared to a reference frequency so as to determine the condition of wear of the tool.

Figure 1:
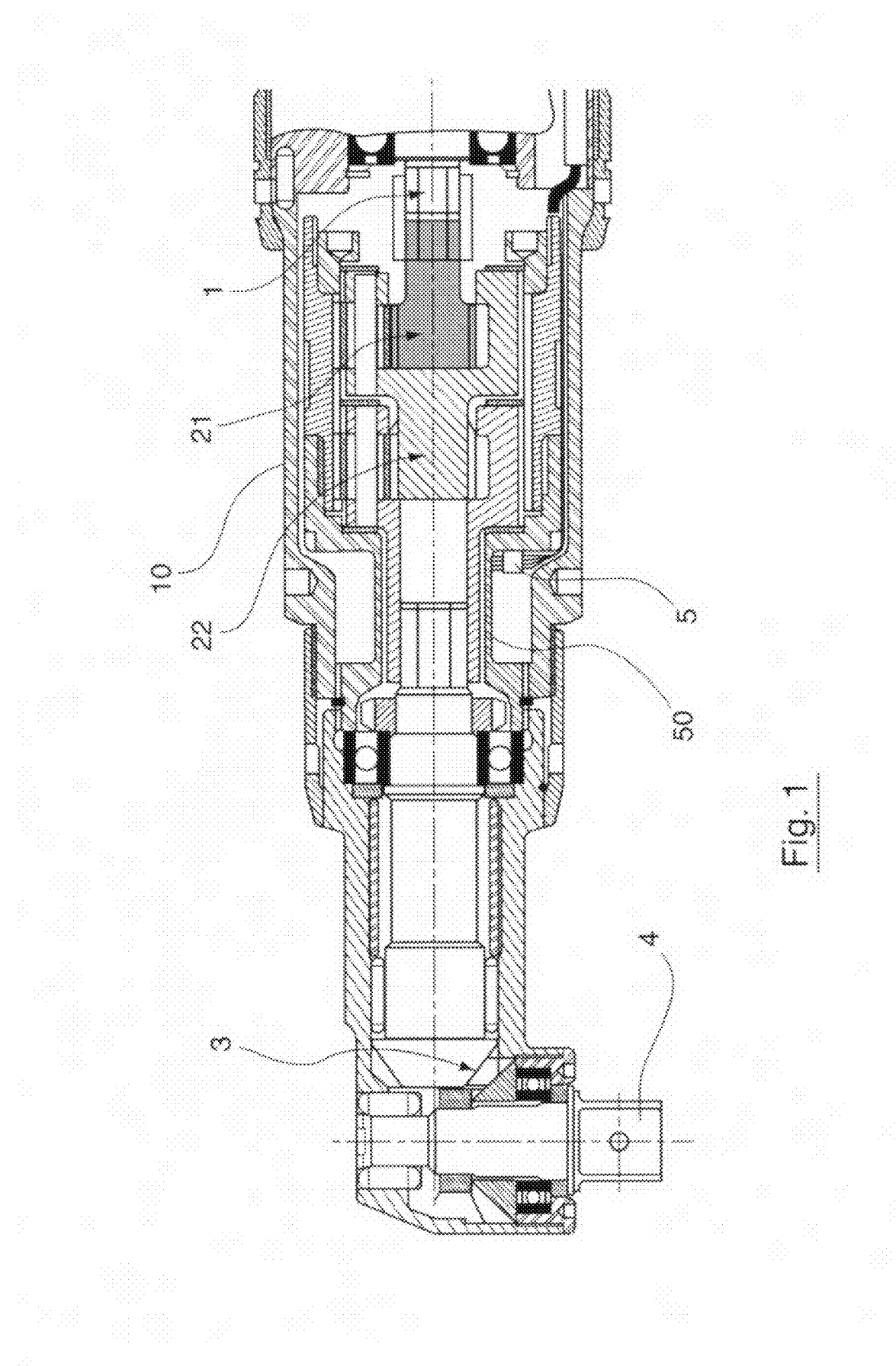
FIG. 1 is a cross-section view of a tool integrated in an equipment assembly according to the subject of this disclosure.

In reference to FIG. 1, a screwing tool according to this embodiment includes a motor (not shown) mounted in the body 10 of the tool, with the motor output being coupled to a first gear stage 21, itself coupled to a second gear stage 22, the latter being in turn coupled to a bell crank gear 3 (the screwing axis in this case being perpendicular to the motor axis; the gear 3 can be absent in the case of another embodiment that can be envisaged in which the screwing axis and the motor axis are coaxial) intended to cause the rotation of a screwing head having a fitting 4 provided for receiving a screwing dowel.

In a manner known per se, a torque sensor 5 (in this case a strain gauge bridge) is mounted on a cylindrical support 50 so as to transmit data on the tightening torque exerted by the tool.

Figure 2:
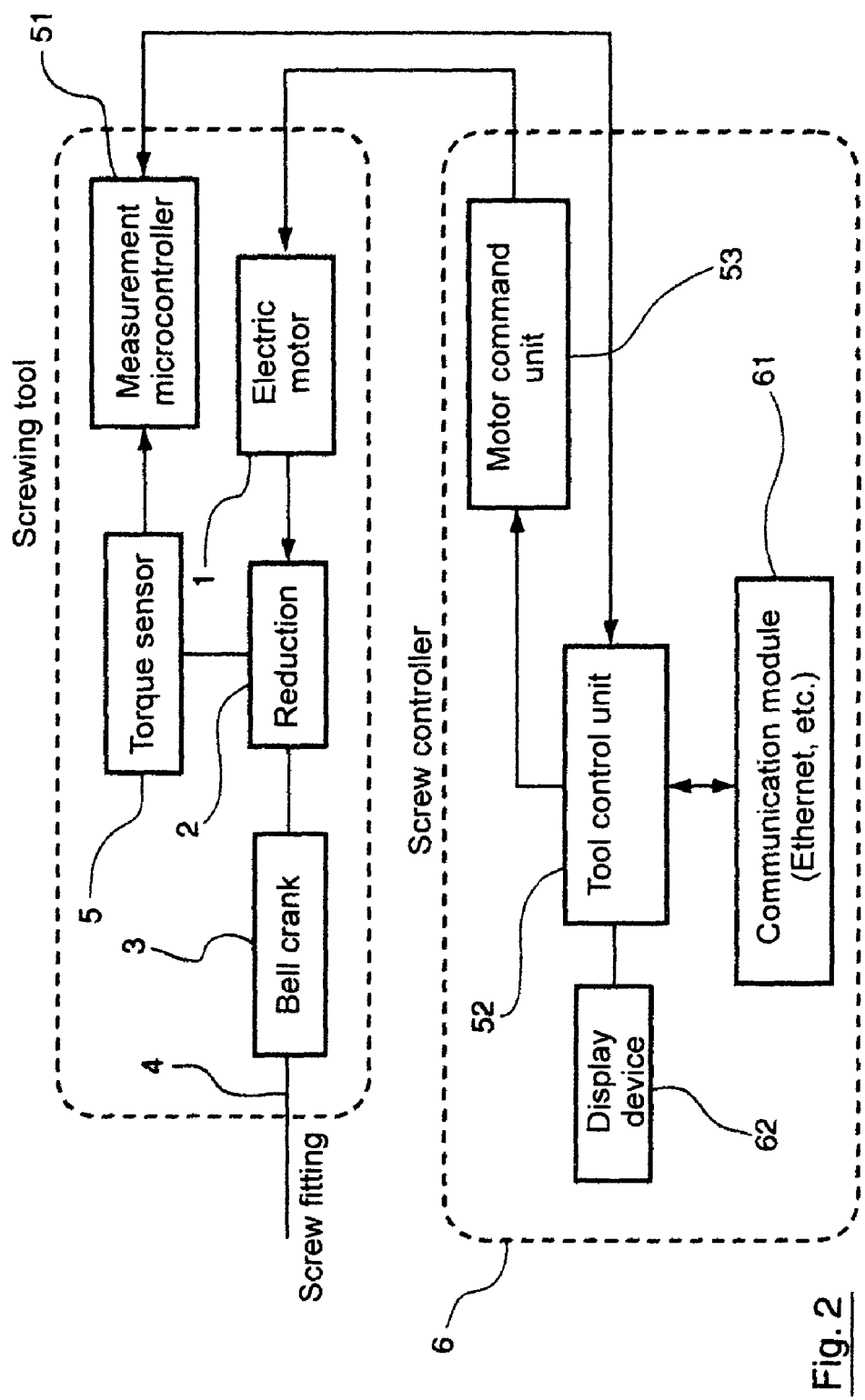
FIG. 2 is a functional diagram of the equipment according to the subject of this disclosure.

In the functional diagram of FIG. 2, the mechanical members are this time shown diagrammatically so as to show the motor 1, a reducer 2 (including the first gear stage 21 and the second gear stage 22 mentioned above).

As shown, the torque sensor 5 is connected to a measurement microcontroller that transmits the data to a control unit 52 of the tool.

According to the data provided by the torque sensor 5, the control unit controls the operation of the motor 1 by means of a command unit 53.

The control unit 52 also includes means for processing the signal provided by the torque sensor in order to identify the vibration frequencies transmitted by each of the rotary members of the tool (motor, first and second gear stages, bell crank gear) so as to compare the frequencies measured with reference frequencies specific to each member and characterising a condition of zero wear.

The vibration frequencies of the rotary members of the tool appear in the form of a frequency spectrum included in the signal provided by the torque sensor, with such a signal being described in greater detail below.

The processing of the vibration frequencies is performed by calculation and storage means included in the control unit 52, with reference frequencies being stored therein so as to be compared, with the assistance of calculation means, with the measured frequencies.

According to this embodiment, the control unit 52 and the command unit are integrated in a unit 6, designated by the term "screw controller" in FIG. 2, separate from the tool.

The screw controller also includes:
  a communication module 61 making it possible to connect the controller to a data exchange network, for example of the Ethernet type; and
  a display device 62.

Thus constituted, when the control unit detects that the amplitude of a vibration frequency of a member of the tool is becoming greater than the corresponding reference frequency, a predetermined signal and/or message is displayed on the display device 62, and optionally sent to a remote station by means of the communication module.

Such a message indicates the defective member concerned and optionally specifies the type of maintenance and/or servicing to be performed.

It is noted that the screwing torque is determined on the basis of a tension transmitted by the torque sensor.

On the basis of this tension, it is possible to obtain a spectrum of frequencies.

Figure 3:
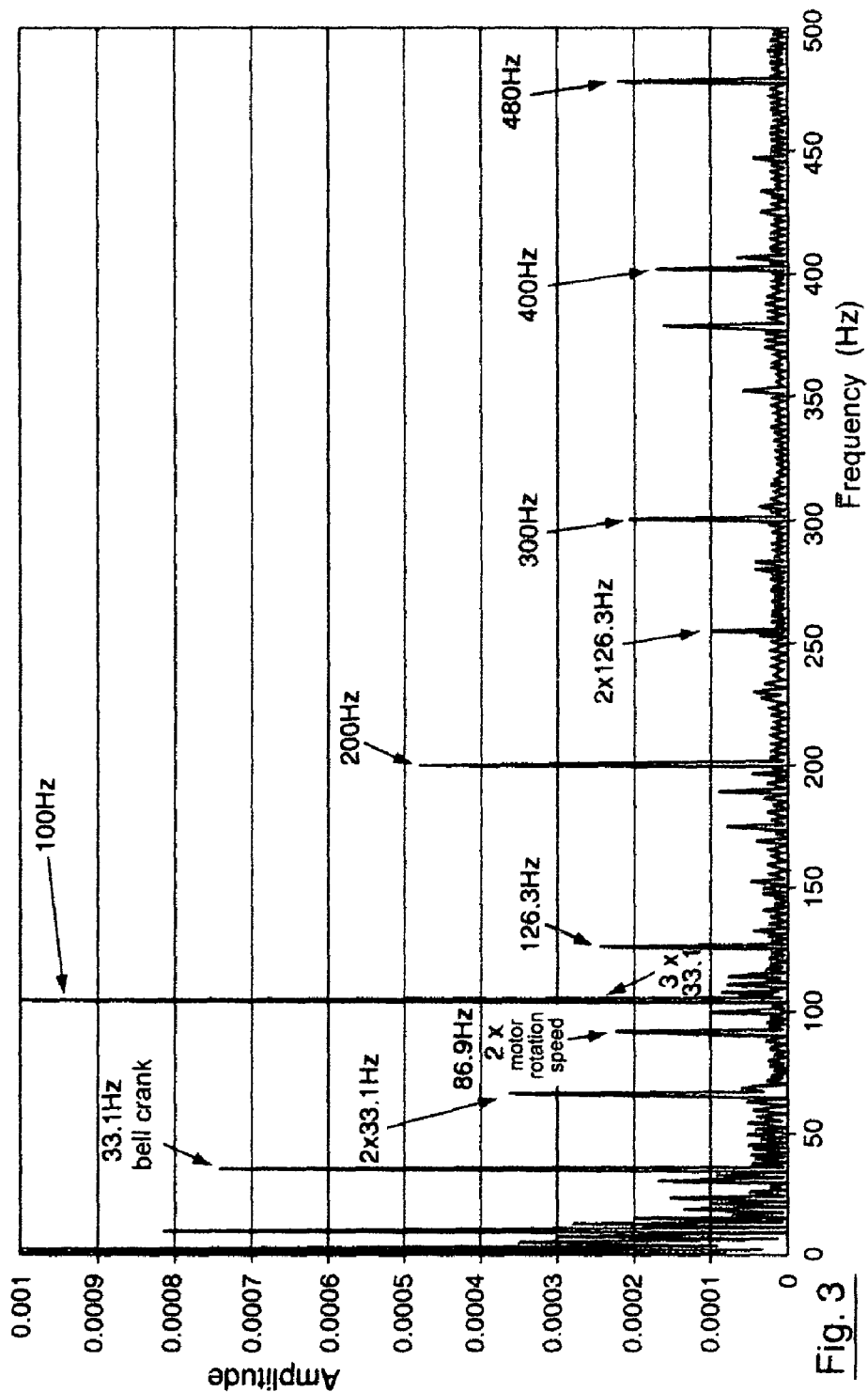
FIG. 3 is a view of a vibration frequency measurement obtained with the equipment according to the subject of this disclosure.

FIG. 3 shows a frequency spectrum measured using a torque sensor of a screwing tool as described above.

By way of indication, the tool in question has a torque range from 5 N.m to 30 N.m, for a maximum speed of 1140 t/mn.

As shown, this signal has a certain number of lines corresponding in particular to the vibration frequencies transmitted by:
  the bell crank gear (33.1 Hz); and
  the motor (86.9 Hz, corresponding to twice the speed of the motor).

It is noted that in a spectrum, a frequency (called fundamental frequency) can produce harmonics, i.e. multiple frequencies of the fundamental frequency. The spectrum then includes frequency lines with values two or even three times the value of the fundamental frequency (or more).

In this case:
  the bell crank produces a fundamental frequency at 33.1 Hz and two harmonics; and
  the electrical disturbance produces a fundamental frequency at 100 Hz and three harmonics;
  the first reduction stage produces a fundamental frequency at 480 Hz.

A spectrum of this type is therefore detected and recorded for a condition of zero wear of the tool. Over the course of successive measurements, the control unit processes the signal so as to verify whether the amplitude of one (or more) of the lines is increasing, and, as the case may be, transmits an alert message or signal.

The objective of the subject of this disclosure is in particular to overcome the disadvantages of the prior art.

More specifically, the objective of the subject of this disclosure is to propose a technique for preventative maintenance of equipment including a tool with a rotary member, such as screwing tools, based on a determination of the real condition of wear of the tool.

Another objective of the subject of this disclosure is to provide such a technique that makes it possible to take into account, in real time, or almost, the condition of wear of the tools.

Another objective of the subject of this disclosure is to provide a technique that contributes to increasing the efficiency of production lines equipped with such tools, in particular by optimising the servicing and/or maintenance interventions.

Another objective of the subject of this disclosure is to provide an ergonomic solution for implementing such a technique.

Yet another objective of the subject of this disclosure is to provide such a technique with a simple design that is easy to implement.

The invention claimed is:

1. A screwing tool including at least one rotary member selected from the group consisting of a motor, a bell crank member, a gear member, and combinations thereof, said rotary member(s) being mounted in a tool body and being capable of producing at least one vibration frequency representing a condition of wear of said rotary member(s), characterised in that the screwing tool comprises processing means including means for storing a reference frequency relative to each of said rotary member(s), and means for measuring said vibration frequency or frequencies and configured to communicate with said means for processing said measurement, making it possible to compare said processed measurement with at least one reference frequency so as to determine the condition of wear, wherein said rotary member(s) are intended to produce a tightening torque, with said measurement means including at least means for measuring said torque.

2. The screwing tool according to claim 1, characterised in that said processing means include calculation means making it possible to process a frequency spectrum obtained on the basis of a signal transmitted by said means for measuring said torque.

3. The screwing tool according to claim 1 characterised in that the screwing tool includes means for issuing an alert when at least one of said vibration frequencies measured reaches a predetermined level with respect to a reference frequency.

4. The screwing tool according to claim 1, characterised in that said processing means are integrated in a control unit separate from said tool.

5. The screwing tool according to claim 4, characterised in that said control unit includes at least one display device.

6. The screwing tool according to claim 4, characterised in that said control unit includes communication means capable of being connected to a communication network.

* * * * *

UNITED STATES PATENT AND TRADEMARK OFFICE
CERTIFICATE OF CORRECTION

PATENT NO. : 7,735,374 B2  Page 1 of 1
APPLICATION NO. : 11/884977
DATED : June 15, 2010
INVENTOR(S) : Vincent Marie et al.

It is certified that error appears in the above-identified patent and that said Letters Patent is hereby corrected as shown below:

Title page item (73) Assignee: Please correct "Saint-Sebastian-sur-Loire (FR)" to read
-- Saint-Sebastien-sur-Loire (FR) --

Signed and Sealed this

Twenty-fourth Day of August, 2010

David J. Kappos
*Director of the United States Patent and Trademark Office*